United States Patent
Cooper et al.

(10) Patent No.: US 7,678,162 B2
(45) Date of Patent: Mar. 16, 2010

(54) GAS DIFFUSION SUBSTRATE AND ELECTRODE

(75) Inventors: Susan Joy Cooper, Reading (GB); Graham Alan Hards, Reading (GB); Gregor Hoogers, Birkenfeld (DE); Sarah Caroline Ball, Oxon (GB); David Thompsett, Reading (GB)

(73) Assignee: Johnson Matthey Public Limited Company, London (GB)

( * ) Notice: Subject to any disclaimer, the term of this patent is extended or adjusted under 35 U.S.C. 154(b) by 284 days.

(21) Appl. No.: 11/970,334

(22) Filed: Jan. 7, 2008

(65) Prior Publication Data

US 2008/0187817 A1 Aug. 7, 2008

Related U.S. Application Data

(62) Division of application No. 10/018,607, filed as application No. PCT/GB00/02305 on Jun. 14, 2000, now Pat. No. 7,338,732.

(30) Foreign Application Priority Data

Jun. 17, 1999 (GB) .................................. 9914023.8

(51) Int. Cl.
H01M 4/82 (2006.01)
H01M 6/00 (2006.01)
H01M 4/00 (2006.01)

(52) U.S. Cl. ...................... 29/623.5; 29/623.1; 429/42; 429/44; 427/115

(58) Field of Classification Search ................ 29/623.1, 29/623.5; 427/115; 429/42, 44
See application file for complete search history.

(56) References Cited

U.S. PATENT DOCUMENTS

| 3,881,957 A | 5/1975 | Hausler |
| 3,992,512 A | 11/1976 | Petrow et al. |
| 5,523,177 A | 6/1996 | Kosek et al. |

FOREIGN PATENT DOCUMENTS

| EP | 0 226 280 A1 | 6/1987 |
| EP | 0 606 051 A1 | 7/1994 |
| EP | 0 654 837 A1 | 5/1995 |
| EP | 0 736 921 A1 | 10/1996 |
| EP | 0 791 974 A1 | 8/1997 |
| WO | WO-98/27606 A1 | 6/1998 |

OTHER PUBLICATIONS

Niedrach et al., "Electrocatalysts for Hydrogen/Carbon Monoxide Fuel Cell Anodes," *Electrochemical Technology*, vol. 5, No. 7-8, Jul.-Aug. 1967, pp. 318-323.

Gottesfeld et al., "A New Approach to the Problem of Carbon Monoxide Poisoning in Fuel Cells Operating at Low Temperatures," *J. Electrochem. Soc.*: Accelerated Brief Communication, Oct. 1988, pp. 2651-2652.

Primary Examiner—Patrick Ryan
Assistant Examiner—Julian Mercado
(74) Attorney, Agent, or Firm—RatnerPrestia

(57) ABSTRACT

An electrically conducting gas diffusion substrate, capable of removing oxidisable impurities from an impure gas stream, which comprises an electrically conducting porous structure and a first catalytic component, wherein the first catalytic component comprises a first catalyst supported on an electrically non-conducting support is disclosed. In addition, an electrode, a membrane electrode assembly and a fuel cell each comprising said electrically conducting gas diffusion substrate is disclosed.

11 Claims, 1 Drawing Sheet

GAS DIFFUSION SUBSTRATE AND ELECTRODE

CROSS-REFERENCE TO RELATED APPLICATIONS

This application is a divisional application of U.S. patent application Ser. No. 10/018,607, now issued as U.S. Pat. No. 7,338,732 B1, filed Jul. 24, 2002, which is the U.S. National Phase Application of PCT International Application No. PCT/GB00/02305, filed Jun. 14, 2000, and claims priority of British Patent Application No. 9914023.8, filed Jun. 17, 1999, the entirety of which applications are incorporated herein by reference.

FIELD OF THE INVENTION

The present invention relates to an improved electrically conducting gas diffusion substrate and an electrode comprising said substrate, suitable for use in particular in proton exchange membrane fuel cells. The invention further relates to a membrane electrode assembly and fuel cell comprising said substrate or electrode.

BACKGROUND OF THE INVENTION

Electrochemical cells invariably comprise at their fundamental level a solid or liquid electrolyte and two electrodes, the anode and cathode, at which the desired electrochemical reactions take place. A fuel cell is an energy conversion device that efficiently converts the stored energy of its fuel into electrical energy by combining hydrogen, stored as a gas, or methanol, stored as a liquid or gas, with oxygen to generate electrical power. The hydrogen or methanol is oxidised at the anode and oxygen reduced at the cathode. In these cells gaseous reactants and/or products have to be diffused into and/or out of the cell electrode structures. The electrodes therefore are specifically designed to be porous to gas diffusion in order to optimise the contact between the reactants and the reaction sites in the electrode to maximise the reaction rate. An electrolyte is required which is in contact with both electrodes and which may be alkaline or acidic, liquid or solid. In a solid polymer fuel cell (SPFC), also known as a proton-exchange membrane fuel cell (PEMFC), the electrolyte is a solid proton-conducting polymer membrane, commonly based on perfluorosulphonic acid materials. These electrolytes must be maintained in a hydrated form during operation in order to prevent loss of ionic conduction through the electrolyte; this limits the operating temperature of the PEMFC to between 70° C. and 120° C., depending on the operating pressure. The PEMFC does, however, provide much higher power density output than the other fuel cell types, and can operate efficiently at much lower temperatures. Because of this, it is envisaged that the PEMFC will find use in vehicular power generation and small-scale residential power generation applications. In particular, vehicle zero-emission regulations have been passed in areas of the United States that are likely to restrict the use of the combustion engine in the future. Pre-commercial PEMFC-powered buses and prototype PEMFC-powered vehicles are now being demonstrated for these applications.

Due to the relatively low operating temperatures of these systems, the oxidation and reduction reactions require the use of catalysts in order to proceed at useful rates. Catalysts, which promote the rates of electrochemical reactions, such as oxygen reduction and hydrogen oxidation in a fuel cell, are often referred to as electrocatalysts. Precious metals, in particular platinum, have been found to be the most efficient and stable electrocatalysts for all low-temperature fuel cells operating below 300° C. The platinum electrocatalyst is provided as very small particles (~20-50 Å) of high surface area, which are often, but not always, distributed on and supported by larger macroscopic conducting carbon particles to provide a desired catalyst loading. Conducting carbons are the preferred materials to support the catalyst.

In the PEMFC the combined laminate structure formed from the membrane and the two electrodes is known as a membrane electrode assembly (MEA). The MEA will typically comprise several layers, but can in general be considered, at its basic level, to have five layers, which are defined principally by their function. On either side of the membrane an anode and cathode electrocatalyst is incorporated to increase the rates of the desired electrode reactions. In contact with the electrocatalyst containing layers, on the opposite face to that in contact with the membrane, are the anode and cathode gas diffusion substrate layers. The anode gas diffusion substrate is designed to be porous and to allow the reactant hydrogen or methanol to enter from the face of the substrate exposed to the reactant fuel supply, and then to diffuse through the thickness of the substrate to the layer which contains the electrocatalyst, usually platinum metal based, to maximise the electrochemical oxidation of hydrogen or methanol. The anode electrocatalyst layer is also designed to comprise some level of the proton conducting electrolyte in contact with the same electrocatalyst reaction sites. With acidic electrolyte types the product of the anode reaction are protons and these can then be efficiently transported from the anode reaction sites through the electrolyte to the cathode layers. The cathode gas diffusion substrate is also designed to be porous and to allow oxygen or air to enter the substrate and diffuse through to the electrocatalyst layer reaction sites. The cathode electrocatalyst combines the protons with oxygen to produce water. Product water then has to diffuse out of the cathode structure. The structure of the cathode has to be designed such that it enables the efficient removal of the product water. If water builds up in the cathode, it becomes more difficult for the reactant oxygen to diffuse to the reaction sites, and thus the performance of the fuel cell decreases. In the case of methanol fuelled PEMFCs, additional water is present due to the water contained in the methanol, which can be transported through the membrane from the anode to the cathode side. The increased quantity of water at the cathode requires removal. However, it is also the case with proton exchange membrane electrolytes, that if too much water is removed from the cathode structure, the membrane can dry out and the performance of the fuel cell also decreases.

The complete MEA can be constructed by several methods. The electrocatalyst layers can be bonded to one surface of the gas diffusion substrates to form what is known as a gas diffusion electrode. The MEA is then formed by combining two gas diffusion electrodes with the solid proton-conducting membrane. Alternatively, the MEA may be formed from two porous gas diffusion substrates and a solid proton-conducting polymer membrane catalysed on both sides; or indeed the MEA may be formed from one gas diffusion electrode and one gas diffusion substrate and a solid proton-conducting polymer catalysed on the side facing the gas diffusion substrate.

Gas diffusion substrates or electrodes are employed in many different electrochemical devices in addition to fuel cells, including metal-air batteries, electrochemical gas sensors, and electrochemical reactors for the electrosynthesis of useful chemical compounds.

In most practical fuel cell systems, the hydrogen fuel is produced by converting a hydrocarbon-based fuel (such as methane) or an oxygenated hydrocarbon fuel (such as methanol) to hydrogen in a process known as reforming. This fuel, referred to as reformate, contains (in addition to hydrogen) high levels of carbon dioxide ($CO_2$), of around 25%, and small amounts of impurities such as carbon monoxide (CO), typically at levels of around 1%. For fuel cells operating at temperatures below 200° C., and especially for the PEMFC operating at temperatures around 100° C., it is well known that CO, even at levels of 1-10 ppm, is a severe poison for the platinum electrocatalysts present in the electrodes. This leads to a significant reduction in fuel cell performance, i.e. the cell voltage at a given current density is reduced. This deleterious effect is more pronounced in PEMFCs operating at lower temperatures.

Various methods have been employed to alleviate anode CO poisoning. For example, reformer technology has been redesigned to include an additional catalytic reactor, known as a preferential or selective oxidation reactor. This involves the injection of air or oxygen into the hydrogen-containing reactant gas stream, prior to it passing over a selective oxidation catalyst, to oxidise the CO to $CO_2$. This can reduce the levels of CO from 1-2% down to below 100 ppm. However, even at these levels, the anode electrocatalyst in the PEMFC is still poisoned.

A further method to alleviate CO poisoning is to use an electrocatalyst that itself has a degree of tolerance to CO, for example Pt/Ru as described by Niedrach et al in Electrochem. Technol., 5, 318, (1967). However, again, it is not possible to fully attain the performance observed when using pure hydrogen i.e. in the absence of CO in the fuel stream, using this approach in isolation.

It has also been found that poisoning of the electrocatalyst by CO at levels of 1-100 ppm can be reduced by the use of an oxygen or air bleed directly into the anode gas stream just before it enters the anode chamber of the fuel cell itself. This is described by Gottesfeld and Pafford in J. Electrochem. Soc., 135, 2651 et seq (1988). This technique is believed to have the effect of oxidising the residual CO in the fuel to $CO_2$, the reaction being catalysed by electrocatalyst sites present in the anode:

$$CO + \tfrac{1}{2}O_2 \rightarrow CO_2$$

This technique provides fuel cell performance that is much closer to the performance observed when no CO is present in the fuel stream.

An improved structure in combination with the use of an air bleed is to add to the substrate a second catalyst (a "gas phase catalyst") that will oxidise CO in the presence of hydrogen, for example as described in EP-A-0 736 921. The use of the additional gas phase catalyst gives improved performance of the electrode over the corresponding electrode without a gas phase catalyst. However, if the gas phase catalyst is supported on a conducting carbon support as described in EP-A-0 736 921, it may not be possible to isolate the gas phase catalyst from the overall electrode potential. The presence of oxygen on the gas phase catalyst particles will induce the gas phase catalyst potential to tend towards a more oxidising, i.e. higher, potential. Overall the electrode could then exhibit a mixed cell potential higher than the hydrogen oxidation potential, leading to a loss of electrode efficiency. Likewise, the electronic conductivity can also lead to a pinning of the potential of the selective oxidation catalyst to the low potential of the anode, which is close to the hydrogen oxidation potential. This will affect the ability of the selective oxidation catalyst to oxidise CO even in the presence of oxygen.

The use of a gas phase catalyst still requires the presence of an air bleed and there are concerns over the long-term sustainability of the cell performance when this approach is employed. This is particularly the case if high levels of air bleed, equivalent to 4% and above of the total reformats fuel volume, are required.

SUMMARY OF THE INVENTION

The object of the present invention is to provide an electrically conducting gas diffusion substrate and electrode capable of removing oxidisable impurities from a gas stream, in which the gas phase catalyst is unable to participate in the electrochemical reaction. This allows optimum performance for both the gas phase catalyst and the electrocatalyst in the electrode because catalyst potentials are then independent of each other. Thus, either a lower level of air bleed is required to give the same performance, or using conventional levels of air bleed, a higher performance is obtained.

Accordingly, the present invention provides an electrically conducting gas diffusion substrate comprising an electrically conducting porous structure and a first catalytic component, characterised in that the first catalytic component comprises a first catalyst supported on an electrically non-conducting support.

DETAILED DESCRIPTION OF THE INVENTION

Figure 1:
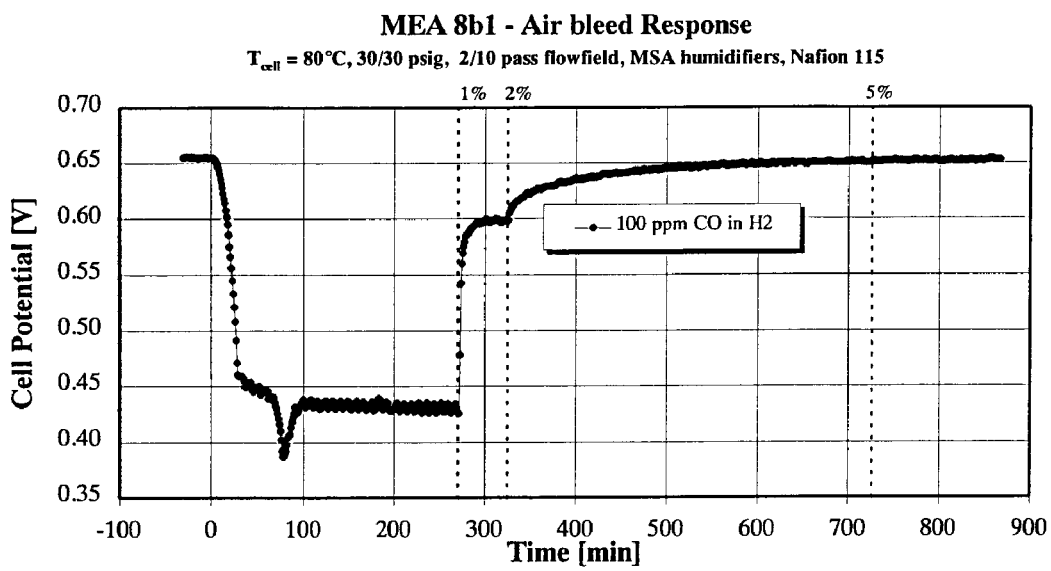
FIG. 1 shows the performance data for the MEAs of Example 6.

The electrically conducting porous structure may be a woven or non-woven fibrous material. For example, the porous structure may be a rigid carbon fibre paper, such as the TGP Series produced by Toray Industries; a woven carbon cloth, such as PWB-3 produced by Zoltek; or a non-woven carbon fibre structure, such as Optimat 203 produced by Technical Fibre Products. Alternatively, the porous structure may be formed from a polymer; for example an expanded polymer mesh as described in WO98/27606. Alternatively, the porous structure may be a metal mesh, for example of nickel or steel. The electrical conductivity of the porous structure may be improved by the addition of a filler material. Suitably, the filler material comprises a particulate carbon and a polymer, the carbon suitably being in the form of a powder. The carbon powder may be any of the materials generally designated as carbon black such as acetylene blacks, furnace blacks, pitch coke based powders and graphitised versions of such materials. Suitably also both natural and synthetic graphites may be used in this application. Such materials may be used either alone or in combination. The particulate carbon, or carbons, in the filler are held together by one or more polymers. The polymeric materials used will contribute to the essential electrode structural properties such as pore size distribution, hydrophobic/hydrophilic balance and physical strength of the gas diffusion layer. Examples of such polymers include polytetrafluoroethylene (PTFE), fluorinated ethylene-propylene (FEP), polyvinylidene difluoride (PVDF), Viton A, polyethylene, polypropylene, ethylene-propylene. The preferred final polymer is PTFE or FEP. The filler material is suitably embedded within the porous structure.

Suitably, the first catalyst is a gas-phase catalyst designed to remove contaminant gases in the fuel or oxidant feed streams, such as for example carbon monoxide in the hydrogen fuel when this is supplied from a reformer. Suitably, the first catalyst may be a noble metal, for example platinum, palladium, ruthenium, rhodium or gold, or a non-noble metal, for example chromium, molybdenum, nickel or manganese, or a combination of one or more noble metals and/or non-noble metals. Preferably, the first catalyst is a noble metal, for example rhodium. The first catalyst is supported on an electrically non-conducting support, which is suitably an oxidic support such as alumina, silica, ceria, zirconia, an oxide of iron, e.g. $Fe_2O_3$, a manganese oxide, e.g. $MnO_2$ or titania. The support is preferably ceria, iron oxide, titania or manganese dioxide if the catalyst is gold. Preferably, the support is alumina or silica.

The first catalytic component may either be embedded within the porous structure or may be applied to the porous structure as a surface layer. If applied to the porous structure as a surface layer, the first catalytic component is suitably applied as a mixture with electrically conducting particles, for example carbon particles such as carbon black. If the first catalytic component is embedded within the porous structure, the first catalytic component may optionally be mixed with electrically conducting particles.

The electrically conducting gas diffusion substrate of the invention may be prepared by taking a pre-formed porous structure, with or without the addition of a filler material, and subsequently in-filling with the first catalytic component or by applying the first catalytic component as a surface layer. If the first catalytic component is embedded within the porous structure, the majority of the catalytic component will be forced into the structure of the porous structure, although a small quantity may remain on the surface. The first catalytic component may be embedded within the porous structure by conventional methods known in the art, for example as filtration, powder vacuum deposition, spray deposition, electrodeposition, extrusion, printing, rolling, K-bar, doctor blade methods, or thin-film casting. If the first catalytic component is applied to the surface of the electrically conducting porous structure, optionally mixed with electrically conducting particles, this too may be carried out using conventional methods known in the art, for example as filtration, powder vacuum deposition, spray deposition, electrodeposition, extrusion, printing, rolling, K-bar, doctor blade methods, or thin-film casting.

Alternatively, in the case of a non-woven fibre structure being used, the gas diffusion substrate may be prepared in a single step process by adapting a continuous manufacturing technique, for example paper making, or extrusion or pultrusion.

A second aspect of the present invention provides a gas diffusion electrode comprising an electrically conducting gas diffusion substrate as hereinbefore defined and a second catalytic component.

Preferably, the second catalytic component comprises an electrocatalyst which facilitates the electrochemical reaction, and may be, for example, a precious metal or a transition metal as the metal or metal oxide, either unsupported or supported in a dispersed form on a carbon support; an organic complex, in the form of a high surface area finely divided powder or fibre; or a combination of these options. Most suitably, the second catalytic component is a platinum/ruthenium alloy supported on carbon black or platinum supported on carbon black.

When functioning as a gas diffusion electrode, the first catalytic component is unable to partake in the electrochemical reaction since the first catalyst is supported on an electrically non-conducting support, and thus no mixed cell potential is obtained.

The electrode of the invention may be used either as the anode or the cathode; suitably it is used as the anode and the first catalytic component is selected to remove CO from an impure hydrogen feed. If used as a cathode, the first catalytic component is selected to remove any oxidisable impurities, whether airborne or unreacted fuels crossing over from the anode.

The second catalytic component may either be applied to the gas diffusion substrate as a separate layer, the first catalytic component either being embedded within the porous structure or applied as a surface layer. Alternatively, the second catalytic component may be applied to the porous structure as a surface layer mixed with the first catalytic component. If the first and second catalytic components are mixed prior to application to the porous substrate, there may or may not be an additional electrically conducting substance included in the mixed layer, since this property will be provided by second catalytic component.

The second catalytic component, whether applied separately or mixed with the first catalytic component may be applied to the gas diffusion substrate or porous structure by conventional methods known in the art, for example by filtration, powder vacuum deposition, spray deposition, electrodeposition, extrusion, printing, rolling, K-bar, doctor blade methods, or thin-film casting.

A third aspect of the invention provides a membrane electrode assembly comprising a gas diffusion electrode of the invention as hereinbefore defined and a second gas diffusion electrode which may or may not be an electrode according to the invention, and a solid polymer membrane, for example Nafion®. Alternatively, the invention provides a membrane electrode assembly comprising a gas diffusion electrode of the invention as hereinbefore defined, a gas diffusion substrate which may or may not be a substrate according to the invention and a solid polymer membrane, for example Nafion®, wherein an electrocatalyst layer is applied to the side of the membrane facing the gas diffusion substrate. Alternatively, the invention provides a membrane electrode assembly comprising a gas diffusion substrate of the invention as hereinbefore defined, a gas diffusion electrode which may or may not be an electrode according to the invention and a solid polymer membrane, for example Nafion®, wherein an electrocatalyst layer is applied to the side of the membrane facing the gas diffusion substrate. Alternatively, the invention provides a membrane electrode assembly comprising a gas diffusion substrate of the invention as hereinbefore defined and a second gas diffusion substrate which may or may not be a substrate according to the invention, and a solid polymer membrane, for example Nafion®, wherein an electrocatalyst layer is applied to both sides of the solid polymer membrane.

A still further aspect of the invention provides a fuel cell comprising a gas diffusion substrate according to the present invention. A yet further aspect provides a fuel cell comprising a gas diffusion electrode according to the present invention. A yet further aspect provides a fuel cell comprising a membrane electrode assembly according to the present invention.

The invention will now be further described with reference to the following examples.

EXAMPLES

Comparative Example 1

Pt/Shawinigan Carbon

A gas phase selective oxidation catalyst layer was prepared as described in Example 1 of EP-A-0 736 921 from a 20 wt % Pt supported on Shawinigan Acetylene Black carbon catalyst, obtained from Johnson Matthey Inc, West Deptford, N.J., USA, to give a metal loading of 0.19 mgcm$^{-2}$ of Pt.

Comparative Example 2

Pt/Shawinigan Carbon

A gas phase selective oxidation catalyst layer was prepared as described in Comparative Example 1 from a 20 wt % Pt supported on Shawinigan Acetylene Black carbon catalyst at a metal loading of 0.33 mg cm$^{-2}$ of Pt.

Example 1

Rh/Alumina 524

A gas phase selective oxidation catalyst layer was prepared using a 5 wt % Rh supported on alumina catalyst, which was obtained from Johnson Matthey Alfa (Type 524 alumina, nominal surface area 141 m$^2$ g$^{-1}$). A PTFE containing ink (35 wt % solids with respect to catalyst weight) was prepared from the rhodium catalyst by a method similar to that described in EP-A-0 736 921. A gas phase selective oxidation layer of the rhodium ink was applied to a side of a pre-teflonated Toray TPG90 paper to give a Rh loading of 0.12 mgcm$^{-2}$.

Example 2

Rh/Alumina 526

A gas phase selective oxidation catalyst layer was prepared as described for Example 1 using a 5% Rh on alumina catalyst obtained from Johnson Matthey Alfa (Type 526 alumina, nominal surface area 150 m$^2$ g$^{-1}$), to give a Rh loading of 0.1 mgcm$^{-2}$.

Example 3

Rh/Alumina 526

A gas phase selective oxidation catalyst layer was prepared as described for Example 1 using a 5% Rh on alumina catalyst obtained from Johnson Matthey Alfa (Type 526, nominal surface area 150 m$^2$ g$^{-1}$), to give a Rh loading of 0.2 mgcm$^{-2}$.

Example 4

Rh/Alumina SCF-140

A catalyst sample of nominal composition 5% Rh on SCF-140 Alumina (obtained from Condea Chemie GmbH, Hamburg) was prepared by a precipitation route. SCF140 alumina (14 g) was slurried in demineralised water (150 cm$^3$) and the pH adjusted to 7.5 by the addition of aqueous ammonia solution. The slurry was stirred and heated to 80° C. Rhodium nitrate solution (5 g, Johnson Matthey Alfa, 14.2 wt % Rh) was diluted to 10 cm$^3$ by the addition of water and added dropwise to the slurry, and the pH was maintained between 7 and 8 during the addition, by periodic additions of aqueous ammonia. The catalyst was dried at 100° C. in air for 2 hrs, and reduced in flowing 10% H$_2$/N$_2$ at 250° C. for 2 hrs. A gas phase selective oxidation layer was prepared from the resulting catalyst as described for Example 1, to give a Rh loading of 0.2 mg cm$^{-2}$.

Example 5

Rh/Silica

A gas phase selective oxidation layer was prepared as described for Example 1, using a 5% Rh on silica powder catalyst obtained from Johnson Matthey Alfa, to give a Rh loading of 0.09 mg cm$^{-2}$.

Ex-Situ Sample Evaluation

The gas phase selective oxidation layers of Comparative Examples 1 and 2 and Examples 1-5 were tested for the removal of CO from a H$_2$ rich gas stream with the addition of an air bleed, in an experimental set-up which was similar to that of a fuel cell. This is termed ex-situ evaluation. The selective oxidation layers were fabricated into small (6.45 cm$^2$) MEAs using a bare piece of Toray TGP90 as a 'cathode' and either a piece of Nafion 115 or a piece of 0.1 mm thick photocopier transparency film, as the membrane. The MEAs were tested in a small fuel cell, with the selective oxidation electrode run as the anode. A humidified fuel stream of 100 ppm CO in H$_2$ was used at a gas flow of 0.2 SLM at a pressure of 30 psi. Humidified N$_2$ at similar flow rates and pressures was used as a 'cathode' stream. The effectiveness of the selective oxidation electrode was assessed by introducing different levels of air bleed into the fuel stream and monitoring the CO level in the output gas stream using a Signal 2000 low flow CO analyser. No electrical load was applied to the electrodes, but the test set up otherwise mimicked the conditions of temperature, humidity and flow rates present within a fuel cell.

Table 1 shows the CO levels found in the output gas stream when different levels of air bleed are applied, in each case readings were taken after 30 mins at steady state.

TABLE 1

| Example | Catalyst | metal loading (mg/cm$^2$) | CO level after 30 mins at steady state/ppm | | |
|---|---|---|---|---|---|
| | | | 1% Air Bleed | 2% Air Bleed | 5% Air Bleed |
| Example 1 | 5% Rh/Alumina 524 | 0.12 | 12 | 6 | 6 |
| Example 2 | 5% Rh/Alumina 526 | 0.1 | 72 | 25 | 2 |
| Example 3 | 5% Rh/Alumina 526 | 0.2 | 40 | 11 | 2 |
| Example 4 | 5% Rh/SCF-140 Alumina | 0.22 | 10 | 7 | 6 |
| Example 5 | 5% Rh/Silica | 0.2 | 75 | 30 | 12 |
| Comparative Example 1 | 20% Pt/Shawinigan Carbon | 0.19 | 83 | 74 | 4 |
| Comparative Example 2 | 20% Pt/Shawinigan Carbon | 0.33 | 75 | 12 | 4 |

All of the catalysts on non-conducting supports show superior air bleed response to the Pt/carbon supported catalyst at equivalent or lower metal loadings. This ex-situ testing identified Example 1 as the most promising candidate for fuel cell testing. Therefore, a fuel cell anode using this gas phase selective oxidation layer was prepared and tested for fuel cell performance as described below.

Comparative Example 3

Pt(Pt/Ru)

A fuel cell anode of 240 cm$^2$ active geometric area was prepared as described in Example 1 of EP-A-0 736 921 with a gas phase catalyst layer prepared from 20 wt % Pt catalyst supported on Shawinigan carbon as described in Comparative Example 1, to give a platinum loading of 0.2 mgcm$^{-2}$ of Pt, and a platinum/ruthenium electrocatalyst with metal loadings of 0.27 mgcm$^{-2}$ of Pt and 0.14 mgcm$^{-2}$ of Ru.

Example 6

(Rh/Alumina)/(Pt/Ru)

A fuel cell anode of 240 cm$^2$ active geometric area was prepared as described in Example 1 of EP-A-0 736 921 with a gas phase catalyst layer prepared from the 5 wt % Rh catalyst supported on Type 524 alumina as described in Example 1. A layer of the rhodium containing catalyst ink was applied to one side of a pre-teflonated Toray TPG90 paper to give a Rh loading of 0.12 mgcm$^{-2}$, such that the rhodium ink was embedded within the Toray paper, thus enabling electronic conductivity through the substrate. The electrocatalyst ink was prepared comprising a PtRu alloy catalyst at nominal loadings of 20 wt % Pt and 10 wt % Ru loading supported on Cabot Vulcan XC72R carbon by a similar method to that described in Comparative Example 3. The electrocatalyst ink was applied to the other side of the Toray paper substrate at a loading of 0.29 mgcm$^{-2}$ of Pt and 0.15 mgcm$^{-2}$ of Ru.

Fuel Cell Evaluation

Figure 2:
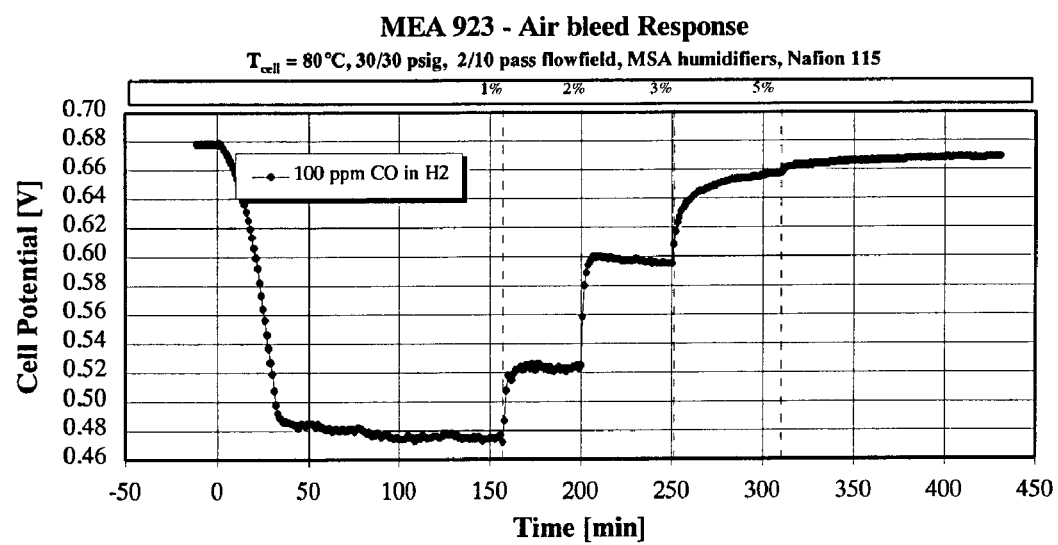
FIG. 2 shows the performance data for the MEAs of comparative Example 3.

From the anodes prepared as detailed in Comparative Example 3 and Example 6, two membrane electrode assemblies were prepared using Nafion 115 membranes and conventional cathodes with nominal Pt loadings of 0.75 mgcm$^{-2}$. The MEA was prepared by hot-pressing the membrane between the anode and the cathode. Samples were then conditioned in single cells overnight with pure hydrogen and air as the fuel and oxidant respectively. The performance with a fuel stream of 100 ppm CO in hydrogen was then assessed. FIGS. 1 and 2 show the performance data for the MEAs of Example 6 and Comparative Example 3 respectively. Initially, the performance on pure hydrogen and air (at the cathode) is recorded. After several minutes, the anode gas stream is switched to 100 ppm CO in hydrogen which causes a degradation of the cell voltage by approximately 220 mV for Example 6 and 200 mV for Comparative Example 3. After the performance has stabilised, air bleeds of increasing levels, starting at 1%, are applied. Example 6 shows slow recovery of the performance loss but almost perfect recovery at 2% air bleed. Comparative Example 3 exhibits a performance still 80 mV lower than that with pure hydrogen at air bleed levels of up to 2%. Only at 5% air bleed level near-complete recovery is observed.

It has been shown that the presence of a non-conducting selective oxidation catalyst shows superior performance to a conventional carbon supported Pt based selective oxidation catalyst when operating in a fuel cell with a fuel stream containing CO in H$_2$ and air bleed.

The invention claimed is:

1. A process for the preparation of a gas diffusion substrate, wherein said substrate comprises (i) an electrically conducting porous structure, and (ii) a first catalytic component, said process comprising in-filling a pre-formed electrically conducting porous structure with the first catalytic component to embed the first catalytic component within the electrically conducting porous structure, wherein the first catalytic component (1) is a gas-phase catalyst designed to remove contaminant gases, and (2) comprises a first catalyst which is one or more noble metals or non-noble metals or a combination thereof, and wherein said first catalyst is directly supported on an electrically non-conducting support.

2. A process according to claim 1, wherein the first catalyst is selected from the group consisting of platinum, palladium, ruthenium, rhodium, gold, chromium, molybdenum, nickel and manganese or a combination thereof.

3. A process according to claim 1, wherein the electrically non-conducting support is an oxidic support.

4. A process according to claim 1, wherein the electrically non-conducting support is selected from the group consisting of alumina, silica, ceria, zirconia, an oxide of iron, a manganese oxide and titania.

5. A process according to claim 1, wherein the electrically conducting porous structure is a woven fibrous material or a non-woven fibrous material.

6. A process according to claim 5, wherein the electrically conducting porous structure further comprises a filler material.

7. A process according to claim 1, wherein the electrically conducting porous structure is formed from a polymer.

8. A process according to claim 1, wherein the electrically conducting porous structure is a metal mesh.

9. A process for the preparation of a gas diffusion electrode, wherein said electrode comprises (i) an electrically conducting porous structure, (ii) a first catalytic component, and (iii) a second catalytic component, said process comprising: (1) in-filling a pre-formed porous structure with the first catalytic component to embed the first catalytic component within the electrically conducting porous structure and (2) applying the second catalytic component to the electrically conducting porous structure as a surface layer;

wherein the first catalytic component (1) is a gas-phase catalyst designed to remove contaminant gases, and (2) comprises a first catalyst which is one or more noble metals or non-noble metals or a combination thereof, and wherein said first catalyst is directly supported on an electrically non-conducting support, and wherein the second catalytic component (1) is an electrocatalyst adapted to facilitate an electrochemical reaction, and (2) comprises a second catalyst which is a precious metal or a transition metal as a metal or a metal oxide, and wherein the second catalyst is either unsupported or supported in a dispersed form on a carbon support, an organic complex in the form of a high surface area finely divided powder or fibre, or a combination thereof.

10. A process according to claim 9, wherein the second catalytic component is a platinum/ruthenium alloy supported on carbon black.

11. A process according to claim 9, wherein the second catalytic component is platinum supported on carbon black.

* * * * *